United States Patent [19]

Lundeberg

[11] 4,090,029
[45] May 16, 1978

[54] LIQUID TIGHT CONNECTOR WITH IMPROVED GROUND CONDUCTIVITY

[75] Inventor: Russell Edgar Lundeberg, West Hartford, Conn.

[73] Assignee: General Signal Corporation, Rochester, N.Y.

[21] Appl. No.: 677,460

[22] Filed: Apr. 15, 1976

[51] Int. Cl.² ............................................. H02G 3/06
[52] U.S. Cl. .................... 174/51; 174/65 SS; 174/78; 285/158; 285/DIG. 19
[58] Field of Search ................... 174/51, 65 P, 153 R, 174/78, 65 SS, 77 R; 339/14 R, 89 C, 177 R; 285/DIG. 19, 189, 158, 95

[56] References Cited

U.S. PATENT DOCUMENTS

| | | | |
|---|---|---|---|
| 2,304,167 | 12/1942 | Hayes | 174/78 |
| 2,552,686 | 5/1951 | Melcher | 174/153 R |
| 2,672,500 | 3/1954 | Bondon | 174/153 R |
| 2,710,381 | 6/1955 | Monson | 174/51 X |
| 2,727,086 | 12/1955 | Madaras | 174/51 |
| 2,821,567 | 1/1958 | Bergan | 174/78 |
| 3,009,128 | 11/1961 | DeCarlo | 174/51 X |
| 3,104,120 | 9/1963 | Myers | 174/65 R |
| 3,424,853 | 1/1969 | Johnson | 174/78 X |
| 3,495,028 | 2/1970 | Tutthill | 174/153 R |
| 3,603,912 | 9/1971 | Kelly | 174/78 X |
| 3,647,934 | 3/1972 | Hurtt | 174/78 X |
| 3,915,479 | 10/1975 | Sotolongo | 285/158 |

Primary Examiner—J. V. Truhe
Assistant Examiner—D. A. Tone
Attorney, Agent, or Firm—Milton E. Kleinman; George W. Killian

[57] ABSTRACT

A liquid tight connector for joining a liquid tight flexible conduit to a junction box or panel and having improved ground continuity is provided. The connector includes a body member having a cast-on lug to which an external ground may be secured. To provide a liquid tight seal between the fitting and the junction box, channel or raceway, an O-ring or similar seal is provided. The O-ring is placed in a recess whose depth and cross section are so related to the size and characteristics of the O-ring, that when the O-ring provides a liquid tight seal, a metallic surface of the body is in contact with the joined metallic member. With this increased metallic contact, there is an improved capacity to conduct fault current. The recess may be positioned to provide substantial contact area on an appropriate side of the perimeter of the O-ring. This protects the contact area from rust and/or corrosion which would reduce the fault current carrying capacity. Serrations, or other means, may be provided to improve the contact between the connector and the joined member and to minimize any tendency to loosen due to vibration. The principles may be adapted to a wide variety of fittings.

8 Claims, 12 Drawing Figures

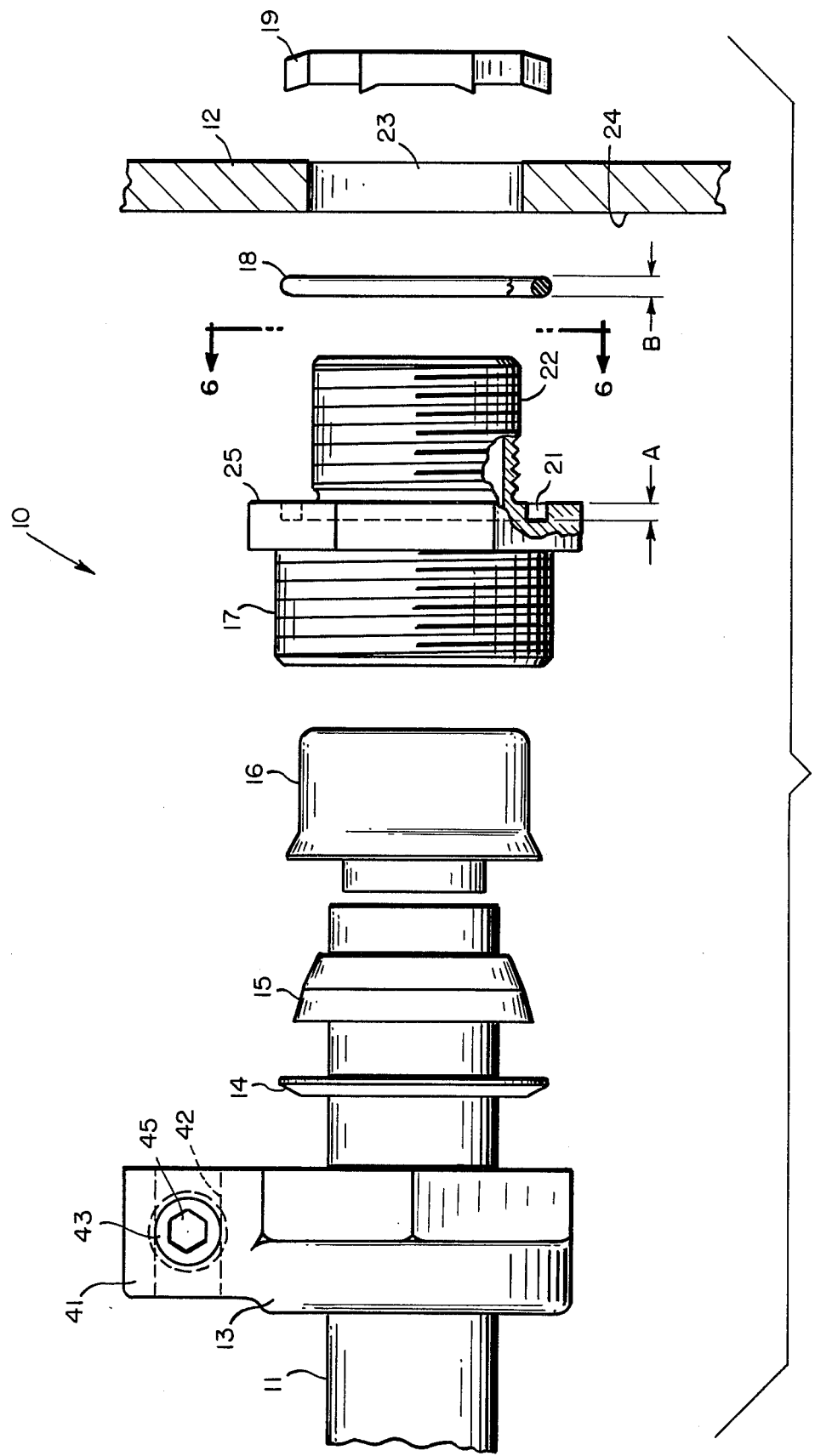

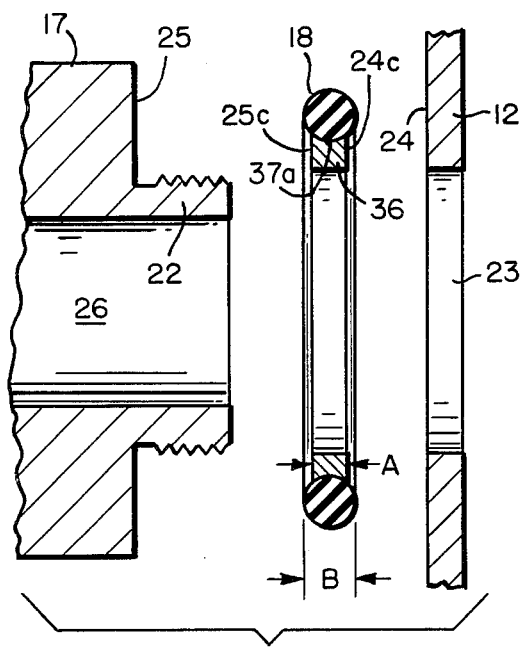
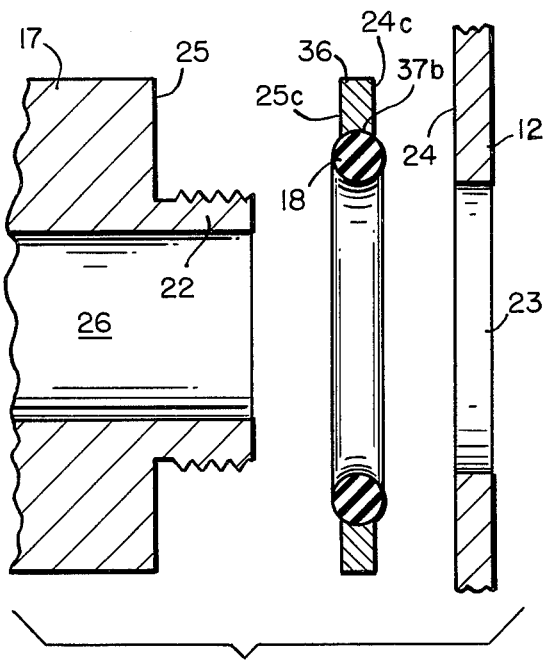
FIG. 8A
FIG. 8B
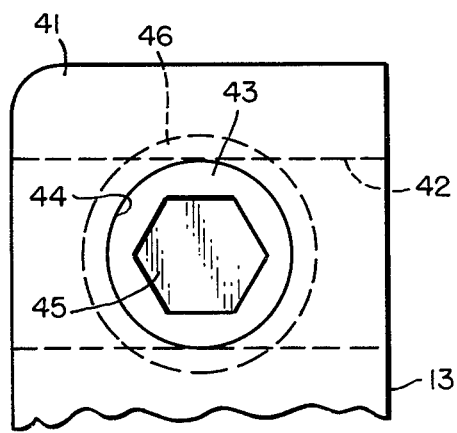
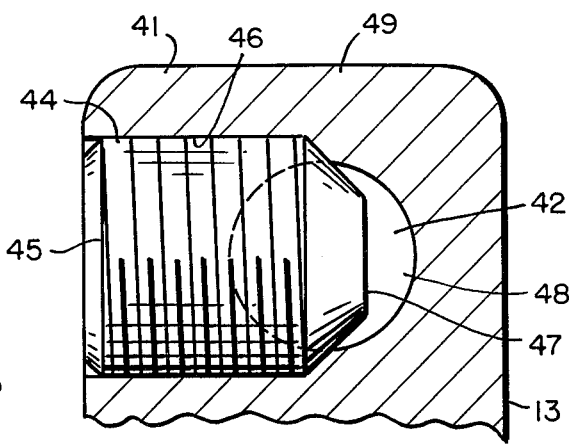
FIG. 9
FIG. 10

LIQUID TIGHT CONNECTOR WITH IMPROVED GROUND CONDUCTIVITY

BACKGROUND OF THE INVENTION

For years, it has been standard practice to connect exposed metallic surfaces of electrical gear to ground potential to reduce the probability of such surfaces having a live potential and subjecting personnel to shock hazards. Experience has shown that unless there is good electrical conductivity between a true ground and the exposed metallic surface, that the surface may not be at a true ground potential and that there is possible shock hazard. In addition, experience has demonstrated that if the grounding circuits have the capacity to conduct large fault currents, the extent of damage resulting from accidental short circuits, fire, lightning and other abnormal conditions, may be materially reduced. Accordingly, efforts have been made to increase conductivity from exposed metal surfaces to ground. Frequently, this includes the use of auxiliary conductors. Since these conductors normally carry little, if any, current their efficacy is normally tested only under adverse conditions. In the case of rigid metallic conduit and electrical metallic tubing, the conduit itself has proven over the years to be a good conductor of ground currents and has provided good service in actual field performance. However, in the case of liquid tight flexible metal conduit, some questions have been raised as to the ability of the conduit itself to carry high order of magnitude fault currents. In sizes larger than 1½ inch, the National Electric Code requires grounding conductors in addition to the current carrying conductors when liquid tight flexible metal conduit is used. In order to provide some means of verifying the validity of grounding conductors, it has become a common practice to run an external grounding conductor along with the conduit so as to provide a more reliable ground path and to have an easily inspectable ground path.

U.S. Pat. No. 3,009,128 discloses what is known in the electrical fittings trade as a grounding bushing which might typically be used for terminating a metal conduit to an electrical panel. The patented grounding bushing has not been a significant commercial success. This may be due to the fact that the lug is not removable from the bushing and in cases where the bushing is installed near the edge of a box; for instance, there is no room to install the bushing. Grounding bushings with removable lugs have been in the industry for years.

United States patent application Ser. No. 623,832 filed Oct. 20, 1975, and issued as U.S. Pat. No. 4,000,918 on Jan. 4, 1977 to Frederick A. Reker and assigned to the same assignee as the present application, discloses a ferrule for making a liquid tight connection to flexible armored conduit. The structure disclosed in application Ser. No. 623,832 finds utility in the present structure.

It is frequently necessary to place electrical apparatus, fittings and enclosures in atmospheres or locations which may be subjected to considerable moisture or liquid. In such situations, it is frequently desirable to provide moisture or liquid tight seals to prevent the entrance of moisture, or liquid, into the electrical apparatus. It has become fairly standard to use various types of gaskets to provide the required moisture barrier. The use of such gaskets has tended to reduce the metallic contact between joined members. The reduced metallic contact may reduce the ability to conduct fault currents through the fitting. This has been a particular problem with liquid tight, flexible metallic conduit which is a marginal conductor of fault current. To overcome this conductivity problem, external ground conductors have been used in addition to the conduit itself.

SUMMARY OF THE INVENTION

The structure disclosed herein provides an electrical fitting for joining; for example, a flexible conduit to a panel, raceway or junction box with a liquid tight seal to prevent the penetration of moisture from one side of the panel, raceway or junction box, to the other side thereof while at the same time providing reduced resistance between the conduit and panel, raceway or junction box.

The reduced resistance between the fitting and the joined panel is obtained by a careful selection of materials, good design and accurate manufacturing tolerances so that the seal which provides the liquid tight feature does not derogate the ability to conduct fault currents between the fitting and the panel. Although other shapes and types of sealing gaskets may be used, there is illustrated a seal comprising an O-ring made of suitable material to provide the desired sealing characteristics. The O-ring is assembled in a groove in a planar surface (or some other shape if circumstances require) which will be drawn into physical contact with the panel to provide the required ground continuity. The material of the O-ring and the depth and cross sectional area of the groove are chosen so that when the planar surface is drawn against the panel, the O-ring forms a liquid tight seal between the panel and the planar surface. As is known to those skilled in the necessary arts, actual contact between the planar surfaces and the panel is not always necessary, provided the space therebetween does not exceed predetermined limits. That is, in the presence of large fault currents, sufficient current can flow to protect the equipment even though there is a minor separation between the panel and the planar surface. However, actual contact is a goal. To provide an improved fault current path for flexible metallic conduit that can be used in combination with other raceway systems, a liquid tight fitting is proposed that has an external ground connection which is in addition to the normal grounding capability of the conduit fittings. This fitting has an added advantage in that the ground connection can be visually inspected to insure that a proper ground connection has been made and can carry higher order fault circuits than the conduit and fittings would otherwise withstand.

To improve electrical contact, and/or to provide a locking action between the planar surface and the panel, the planar surface may include serrations or a roughened surface which can dig into the panel surface and/or cut through oxide or paint. The planar surface for contacting the panel surface may be either inside or outside, or both inside and outside, the area enclosed by the O-ring. Depending upon the possible source of moisture, either the area inside the O-ring or the area outside the O-ring may be protected from moisture. Having an area protected from moisture is desirable to minimize derogation of conductivity due to rust and corrosion. If it is not desired to have contacting areas both inside and outside the area enclosed by the O-ring, the area which need not conduct fault current could be recessed to thereby increase the unit pressure on the contacting surfaces.

The surfaces which come together to provide the electrical continuity may be inclined at slight relative angles to improve the ability to chip or scrape paint and increase initial per unit contact pressure.

It is an object of this invention to provide a new and improved electrical fitting for joining two members with a liquid tight seal therebetween and improved electrical conductivity.

It is a more specific object of the invention to provide a liquid tight seal with improved electrical conductivity.

It is another object of the invention to provide a liquid tight sealing structure which is effective when the joined members are in good electrical contact.

It is another object of the invention to provide means for protecting the grounding circuit path from moisture.

It is another object of the invention to provide overall improved conduction through a fitting by providing a cast-on ground lug.

It is another object of the invention to provide improved fitting conduction by preventing the crushing of external ground wires in the lug.

It is another object of the invention to provide a structure which resists loosening due to vibration.

It is another object of the invention to provide an improved structure which provides high initial per unit contact pressure.

It is another object of the invention to provide an improved structure which provides inspectability of the ground path.

It is another object of the invention to provide an improved structure which minimizes the possibility of corrosion by using parts of similar material as much as possible.

BRIEF DESCRIPTION OF THE DRAWING

Various features, objects and advantages of the structure will become apparent as the drawing is studied together with the accompanying specification. In the drawing, a given element, or a minor variation thereof, has the same two digit number in all views. In the drawing;

FIG. 1 comprises an exploded view of an electrical fitting with selected elements having portions shown in cross section;

FIGS. 8A and 8B illustrate alternate assemblies;

FIG. 9 is an enlarged view of the lug on one of the elements of FIG. 1; and

FIG. 10 is a side view of the lug of FIG. 9.

DESCRIPTION OF THE PREFERRED EMBODIMENTS

Figure 2A:
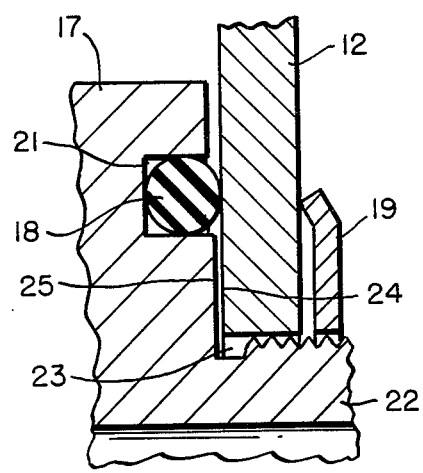
FIGS. 2A and 2B comprise an enlarged cross sectional view of a portion of the fitting in partially and fully assembled relationship, respectively.

Referring now more particularly to the drawing, and specifically to FIG. 1, there will be seen an exploded view of one form of the structure comprising a fitting for providing a liquid tight connection from jacketed flexible conduit 11 to a rigid metallic wall such as panel 12. The fitting is generally designated 10 and comprises a gland nut 13, an optional washer 14, a compressible elastomeric sealing element 15, a ground ferrule 16, a body member 17, an O-ring 18, and lock nut 19. These basic elements are not new in the art and their use and function is more fully shown and described in the co-pending application of Frederick A. Reker, filed Oct. 20, 1975, entitled FERRULE FOR LIQUID TIGHT FLEXIBLE METAL CONDUIT and assigned Ser. No. 623,832. The cited application is assigned to the same assignee as the present application. The novel features which distinguish the fitting 10 from that disclosed in the cited application will be more fully described hereinbelow.

For a variety of reasons, including safety of personnel, it is desirable to have exposed metallic surfaces of electrical fittings, junction boxes, motor housings and other equipment at ground potential. Furthermore, under certain circumstances, it is highly desirable to have the grounding circuit be able to conduct a large fault current. Experience has shown that the fitting described in the co-pending application is incapable to conducting sufficiently large fault currents because of the minimum metal-to-metal contact between the panel and the body member and also because the conduit itself is limited in the amount of fault current it is able to conduct. The minimum metal-to-metal contact results from the use of the O-ring to provide the liquid tight seal. The present structure provides an O-ring 18 and a liquid tight seal as well as an adequate metal-to-metal contact to permit conduction of an increased fault current.

The present structure provides for increased metal-to-metal contact between the body member 17 and the panel 12 by providing, in the body member 17, a recess or groove 21 into which the O-ring 18 fits. The depth of the groove 21 is controlled and is a little less than the cross section diameter of the O-ring 18. More specifically, the dimension "B", which represents the diameter of the cross section of the O-ring 18, is a controlled amount greater than the dimension "A", which represents the depth of the recess 21. The volume of the recess is a function of the characteristics of elastomeric O-ring such as the degree of compressibility.

Figure 5:
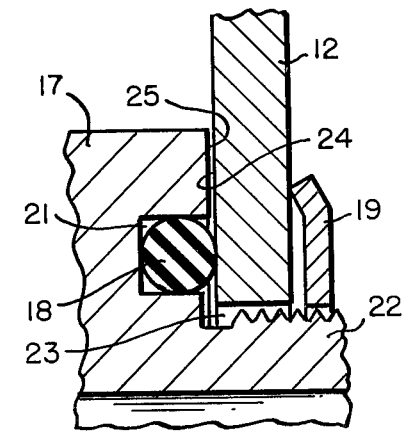

Considering now more particularly FIG. 5, there will be seen an enlarged portion of the body member 17, the groove 21, the O-ring 18 and the panel 12. When the body member 17 is assembled with the panel 12 so that the threaded portion 22 of the body member 17 is inserted through the hole 23 in the panel 12 and the lock nut 19 is assembled on the threaded portion 22, it will be seen that the panel 12 first contacts the O-ring 18. In response to additional tightening of the lock nut 19, it will be apparent that the O-ring 18 may be slightly compressed between the base of the groove 21 and the surface 24 of panel 12. At the same time, the surface 24 will come into contact with the surface 25 of body member 17. By properly controlling th dimensions "A" and "B", a liquid tight seal can be obtained concurrent with the mating of surfaces 24 and 25. Because of the metal-to-metal contact between the surfaces 24 and 25, the ability to conduct large fault currents between the body member 17 and the panel 12 is greatly increased. In prior art devices, without the groove 21, the surfaces 24 and 25 would remain separated and the only possible conduction path from body member 17 to panel 12 is through the threads 22 to lock nut 19 and the panel 12 which is a path of uncertain and questionable current carrying capacity due to the small areas involved.

Figure 2B:
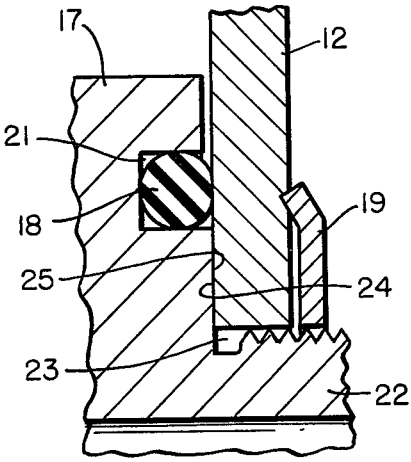
Figure 3:
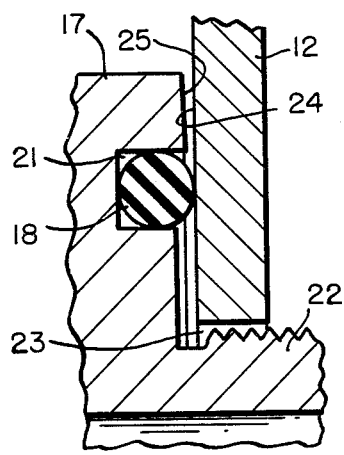
FIGS. 3, 4 and 5 illustrate alternate constructions of a part of the fitting.
Figure 4:
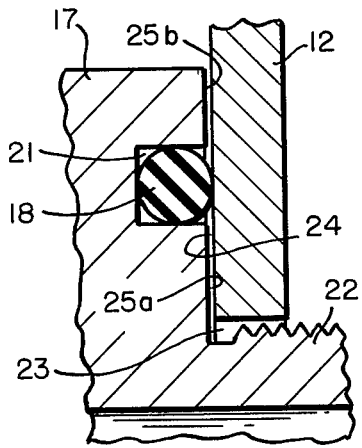

FIGS. 2A, 2B, 3 and 4 illustrate alternate structures. Very briefly, the primary point of distinction between the structures of these figures is the relative position between the liquid tight seal created by the O-ring 18 and the electrical continuity created through the surfaces 24 and 25. For example, in FIG. 2A, the surfaces 24 and 25 are within the area enclosed by the O-ring 18, while in FIG. 3, the surfaces 24 and 25 are external to the area enclosed by the O-ring 18. The choice of the structure of FIG. 2A or that of FIG. 3 may depend upon a variety of factors including, but not limited to, the magnitude of the fault current that may be conducted, the maximum allowable size of the fitting, the direction from which moisture may be attacking the fitting, and the adaptability of the structures to manufacturing and assembly. If the surfaces 24 and 25 are kept on the dry side of the O-ring 18, it will protect the surfaces 24 and 25 from rust and corrosion which might result from moisture and which could derogate the conducting qualities. FIG. 2B is the same structure as that shown in FIG. 2A, but shows the surfaces 24 and 25 in actual contact with the O-ring 18 forming a liquid tight seal with panel 12. The structure of FIG. 4 illustrates an assembly wherein contact is made between surface 24 and 25a and also between surfaces 24 and 25b. In those figures illustrating a lock nut 19, it will be observed that it is a conventional lock nut which has bent over corners, or edges, which will dig into the panel 12 to help improve the electrical conductivity and resist loosening due to vibration.

While FIGS. 2A, 2B, 3, 4 and 5 all illustrate the body member 17 as having male threads, it will be apparent that in an alternate structure the body member 17 might have female threads in which case the fitting would be attached to the panel 12 by means of a member with male threads, and known in the electrical fittings trade as a chase nipple. The chase nipple would be part of the overall assembly and would function as a pressure connector and substitute for the locknut 19 of FIG. 1. In the illustrations, the groove 21 has been placed in the body member 17. It will be apparent that if desired, and if the panel 12 were thick enough, the groove 21 could be incorporated into the panel member 12. A groove and associated O-ring could also be placed in the locknut 19 in addition to, or as a substitute for, the groove and O-ring in the panel 12 and/or the body member 17.

FIG. 3 illustrates another variation which could be incorporated into any of the other figures. More specifically, the surface 25 is inclined at a slight angle with respect to the surface 24. This results in the forward projecting part of the surface 25 making first contact with surface 24 of panel 12, and a higher resultant per unit pressure which will result in breaking or chipping paint. The forward projecting part of the surface 25 could be placed anywhere on the surface 25.

Figure 6:
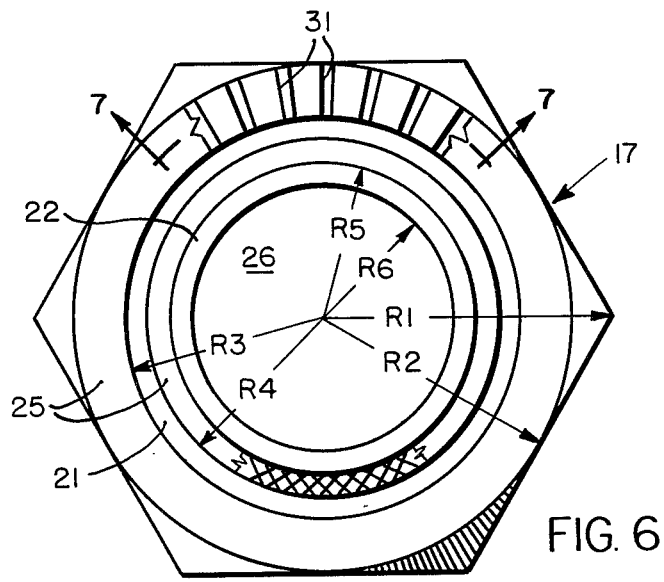
FIG. 6 is an enlarged front view of one element as seen from plane 6—6 of FIG. 1.
Figure 7:
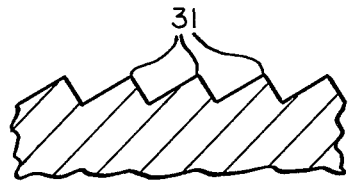
FIG. 7 is a section view taken on line 7—7 of FIG. 6.

Considering now more specifically FIG. 6, there will be seen a front view of the body member 17 with the view from the plane 6—6 of FIG. 1. The body member 17 of FIG. 6 is drawn to an enlarged scale with respect to that of FIG. 1. As will be seen, the body member 17 has a generally hexagonal shape. However, other shapes including square, round or octagonal could be used. As may be seen, the groove 21 is generally circular and extends between the radii designated R3 and R4. The difference between the radii R3 and R4 equals the width of the groove 21 and is approximately equal to the thickness "B" of the O-ring 18. The difference between radii R5 and R6 represents the thickness of the threaded portion 22 of the body member 17. R6 represents the radius of the through hole 26 through the body member 17. If the radii R4 and R5 are approximately equal, a structure similar to that illustrated in FIG. 5 would be provided. If there is a distinct difference between the radii R4 and R5 and also between the radii R2 and R3, a structure similar to that indicated in FIGS. 2A, 2B, 3 and 4 is illustrated. According to a variety of considerations, it may be desirable to have the land area of the body member 17 which contacts the panel 12 be either inside or outside, or partly inside and partly outside, the radius of the O-ring 18 which lies in the groove 21. To provide the structure of FIGS. 2A and 2B, the contacting land area would reside between the radii R4 and R5. Furthermore, the land area between the radii R3 and R2 would be recessed with respect to the land area between R5 and R4. To provide the structure of FIG. 4, the land area between the radii R5 and R4 and also the land area between the radii R3 and R2 would also reside in the same plane. In order to improve the electrical conductivity between the body member 17 and the panel 12, the land area that is designed to make contact may be serrated knurled or otherwise have barbs or projections formed thereon or include an electrically conductive coating which includes projections for digging into the panel 12 and/or removing or breaking through any coating, such as paint, which might be on the panel 12. The serrations might be in the form of teeth similar to those illustrated between radii R3 and R2 and as illustrated in FIG. 7. With teeth 31 formed in this manner, they might serve not only to improve the conductivity between the body member 17 and the panel 12 by penetrating any coating on the panel member 12, but, in addition, to help prevent relative rotation between the body member 17 and the panel 12 in one direction. In addition to the land areas already described, which might be utilized to contact the panel member 12, the land area between the radii R1 and R2 might also be used. The different hatching marks used in the various land areas are intended to illustrate that various types of serrations may be used. No particular type of serration is limited to any particular land area. The choice of serrations used depends upon various factors including, but not limited to; the type of material of which the body member 17 and/or the panel 12 may be made; the type of coating which may be on the panel 12; the maximum area in the contact land; the probability of vibration; the cost of manufacture and other factors which those familiar with the art may wish to consider in connection with final design details.

It will be apparent that should design considerations require such structure, it would be possible to provide a body member 17 having two or more concentric grooves similar to groove 21 and with a land area therebetween.

Other structural modifications are illustrated in FIGS. 8A and 8B. In these structures, instead of providing a groove 21, as shown in FIGS. 2, 3, 4 and 5, a grounding ring 36 is used. The grounding ring 36 has surface 25c which mates with surface 25 of body member 17, and face 24c which mates with face 24 of panel 12. In lieu of smooth mating surfaces, any one or more of the surfaces 24, 24c, 25 and 25c could include serrations to improve the electrical contact between the mating surfaces. Any of the surfaces of the grounding ring 36 could be inclined as was surface 25 in FIG. 3; or any surface could be concave or convex. The O-ring is retained on the outer perimeter of the grounding ring 36 of FIG. 8A by providing a suitably curved seat 37a for retaining and accommodating the O-ring 18. It should be observed that the diameter "B" of the O-ring 18 is only slightly greater than the width "A" of the grounding ring 36. Accordingly, when the fitting is assembled and secured to the panel 12, the O-ring 18 will form a liquid tight seal between the surfaces 25 and 24. The ratio of the dimensions "A" and "B", together with the physical properties of the O-ring 18, are such that when the O-ring 18 creates a liquid tight seal, the surfaces 25 and 25c and the surfaces 24 and 24c are in good electrical contact.

FIG. 8B is very similar to FIG. 8A except that the O-ring 18 is retained in a seat 37b interior to the grounding ring 36. The choice between the structures of FIGS. 8A and 8B may depend upon a variety of factors including on which side the liquid tight seal it is more expeditious to place the grounding contacts. The grounding rings 36 of FIGS. 8A and 8B could be identical with both interior and exterior seats 37b and 37a, respectively, and, if desired, two O-rings could be used.

The use of one of the structures illustrated in FIGS. 8A or 8B or some modification thereof, may find particular utility where it is desired to use a fitting similar to that shown in the cited co-pending application and which does not have a groove 21. That is, by using the grounding ring 36 and O-ring 18, a prior art fitting may be converted to a liquid tight fitting that provides superior current carrying capacity between the fitting 10 and the panel 12.

Providing a good electrical contact between the body member 17 and the panel 12 is of no avail unless provision is made for conducting large fault currents between the body member 17 and ground. Prior art devices depended upon the conduit and the connections between the conduit and the body to provide a suitable ground path. The disclosed device provides essentially two ground paths, one through the conduit itself and one through a separate external grounding lug and wire. The present structure in FIGS. 1, 9 and 10 illustrate an improved lug for providing the ground connection to the body member. U.S. Pat. No. 3,009,128 disclosed an integral lug on a grounding bushing. Because the lug was not removable from the bushing, the patented grounding bushing could not be installed in typical confined spaces. The present structure deals with a unique application on liquid tight conduit where removability is not a requirement as the structure is not used in confined spaces; and the integrally cast lug provides many advantages such as no dissimilar metals between the lug and the fitting, inspectability of the grounding path, and improved reliability in that there are two grounding paths viz; the conduit itself and the disclosed fitting and external ground wire configuration.

The concept of inserting a wire in a hole through a lug, and having the wire held in place by a set screw, which projects through a wall of the lug, and bears against the wire is not new. In typical prior art devices, the diameter of the retaining set screw is noticeably smaller than the diameter of the wire hole. In such structures, there have been numerous occurrences of a set screw being tightened so hard that it severs the conductor that it is intended to retain. This, obviously, results in a ground connection of inferior or questionable quality. The severance or damaging of a grounding conductor is most apt to occur with grounding conductors of No. 12 AWG or smaller.

The present structure provides means for minimizing the hazard of severing a ground wire without any sacrifice in the ability to conduct large fault currents. Accordingly, a continuous and superior electrical path may be obtained from an external ground through the lug 41, the fitting 10, to the panel 12.

Considering now more specifically FIG. 9, there will be seen an enlarged view of the ground lug 41 which forms an integral part of the gland nut 13 as shown in FIG. 1. The lug 41 has a through hole 42 into which a ground wire (not shown) may be placed. At right angles to the through hole 42 is a set screw hole 43. The axes of the through hole 42 and the set screw hole 43 intersect at right angles. As may be seen in FIG. 9, the diameter of the through hole 42 is approximately equal to the root diameter 44 of the set screw 45; the pitch diameter of the set screw 45 is represented by the circle 46. As may be seen in both FIGS. 9 and 10, and as previously memtioned, the diameter of the through hole 42 is of the same order of magnitude as the root diameter 44 of the set screw 45. Accordingly, if the set screw hole 43 is drilled to a depth such that it comes to a plane which is at right angles to the axis of the set screw hole 43 and includes a diameter of the through hole 42, a geometry will be provided which prevents the tightening of the set screw 45 to a sufficient amount to crush the wire laid in the through hole 42. That is, the end 47 of the set screw 45 cannot reach the bottom 48 of the through hole 42. To help assure this relationship, a flat bottom set screw 45 should be used.

Occasionally, circumstances are such that it is expedient to be able to place an intermediate portion of a wire in a lug instead of an end portion. In such cases, a lug with an open side and called a "lay-in" lug is used. Should a lay-in lug be desired, a portion of the ground lug 41 could be cut away at 49 to provide a slot (not shown) to permit laying a wire through the slot in the area 49 and into the through hole 42.

It will also be evident that the set screw 45 could be placed in one of the other faces of the ground lug 41. In order to provide a maximum number of thread engagements between the set screw 45 and the ground lug 41, the wall thickness through which the set screw hole 43 is drilled and tapped may be a little thicker than the other walls of the ground lug 41. The fitting 10 could be a straight through fitting as illustrated or may have an angle change.

While there has been shown and described what is considered at the present to be a preferred embodiment of the invention, modifications thereto will readily occur to those skilled in the related arts. For example, instead of an O-ring, a seal of rectangular cross section could be used, and/or the ground lug could be made a part of the body member instead of the gland nut. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiments shown and described, and it is intended to cover in the appended claims all such modifications as fall within the true spirit and scope of the invention.

What is claimed is:

1. An electrical fitting for attachment to an end of a flexible metal conduit, having a nonconducting liquid tight outer jacket, to provide parallel internal and external grounding connections and to facilitate coupling the conduit to a panel member and comprising in combination elements assembled in the named sequence:

(a) a gland nut having internal threads and an integral ground lug;

(b) a sealing ring;
(c) a one piece ferrule having threads on an internal sleeve and including,
 (1) an outer sleeve having cylindrical sides and
 (2) a flared lip engaging said sealing ring;
(d) a body member having,
 (1) an interior surface in mating engagement with the cylindrical sides of said ferrule;
 (2) a first threaded end mating with the threads of said gland nut for coupling said elements together in response to the relative rotation of said body member and said gland nut, whereby there is electrical continuity between said gland nut, said body member, and said ferrule; and
 (3) a second threaded end for insertion in an opening in a panel member; and
(e) a lock nut on said second threaded end for coupling said fitting to a panel member whereby said ground lug on said gland nut may be oriented at any selected angular orientation in the plane of said gland nut as said fitting is secured to the panel in response to the rotation of said lock nut on said second threaded end.

2. The combination as set forth in claim 1, wherein said ground lug on said gland nut has a first hole therethrough whose axis is parallel to the axis of said conduit and into which a grounding wire may be placed.

3. The combination as set forth in claim 2, wherein said ground lug has a threaded hole intersecting said first hole for securing a set screw which in turn secures a wire in said first hole.

4. The combination as set forth in claim 3, wherein said threaded hole has a diameter approximately equal to the diameter of said first hole.

5. An electrical fitting for an electrical and liquid tight connection to a panel member and comprising in combination:
(a) a body member having a threaded member projecting therefrom with a passage through said body member and said threaded member;
(b) a ring encircling said threaded member and having:
 (1) a first surface for mating with said body member; and
 (2) a second surface for mating with the panel member when said threaded member is inserted in an opening in the panel:
(c) an elastomeric seal comprising an endless loop encircling said threaded member; and
(d) pressure means threadingly coupled to said threaded member whereby with said threaded member inserted through the opening in the panel said pressure means can be threaded onto said threaded member for coupling said body member to the panel with a liquid tight and electrical connection in response to engagement of said pressure means with said threaded member.

6. The combination as set forth in claim 5, wherein said ring includes means on its outer perimeter for retaining said elastomeric seal.

7. The combination as set forth in claim 5, wherein said ring includes means on its inner perimeter for retaining said elastomeric seal.

8. The combination as set forth in claim 5, wherein at least one of said first and second surfaces has serrations for enhancing the electrical contact between said body member, said ring and the panel.

* * * * *